United States Patent
Batchelder et al.

(10) Patent No.: US 8,151,410 B2
(45) Date of Patent: Apr. 10, 2012

(54) BLOWER AND ROTARY RAKE FOR DEBRIS HERDING

(76) Inventors: Rachael Anne Batchelder, Somers, NY (US); John Samuel Batchelder, Somers, NY (US)

(*) Notice: Subject to any disclaimer, the term of this patent is extended or adjusted under 35 U.S.C. 154(b) by 994 days.

(21) Appl. No.: 12/152,607

(22) Filed: May 15, 2008

(65) Prior Publication Data
US 2009/0282795 A1    Nov. 19, 2009

(51) Int. Cl.
*A47L 5/00* (2006.01)

(52) U.S. Cl. ........ 15/385; 15/402; 15/405; 15/339; 15/DIG. 1; 56/187; 56/193

(58) Field of Classification Search ...... 15/340.1–340.4, 15/383, 385, 402, 405; *A47L 5/00*
See application file for complete search history.

(56) References Cited

U.S. PATENT DOCUMENTS

| | | | |
|---|---|---|---|
| 333,917 A | 1/1886 | Brown | |
| 3,611,690 A | 10/1971 | Zweegers | 56/366 |
| 5,572,856 A * | 11/1996 | Ku | 56/10.2 A |
| 5,784,756 A | 7/1998 | Slocum et al. | 15/348 |
| 5,991,973 A | 11/1999 | Simpson | 15/402 |
| 2006/0236671 A1* | 10/2006 | Summerville et al. | 56/378 |
| 2007/0294991 A1* | 12/2007 | Medina et al. | 56/11.9 |
| 2008/0109126 A1* | 5/2008 | Sandin et al. | 701/23 |

* cited by examiner

*Primary Examiner* — David Redding
(74) *Attorney, Agent, or Firm* — Brian R. Morrison; Westman, Champlin & Kelly, P.A.

(57) ABSTRACT

A debris herding method and apparatus is described comprising a low power air blower and a tilted rotary rake. The air blower acts together with a tilted rotary rake to dislodge and impel the debris. A motor driven chassis transports the blower and the rotary rake across the lawn. The blower and rotary rake can be energetically powered, such as by a solar cell array mounted to the chassis. The present invention is directed to an energetically efficient device for moving debris on a surface, such as leaves on a lawn.

15 Claims, 4 Drawing Sheets

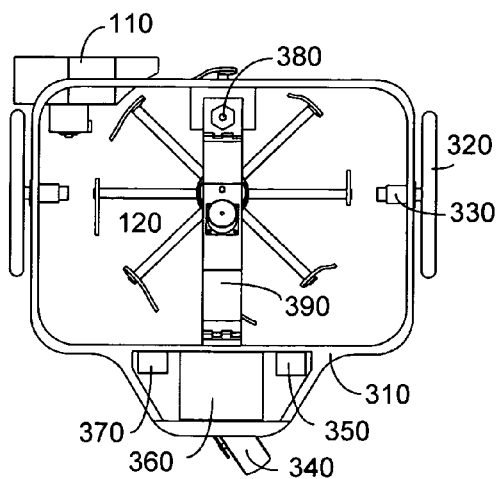
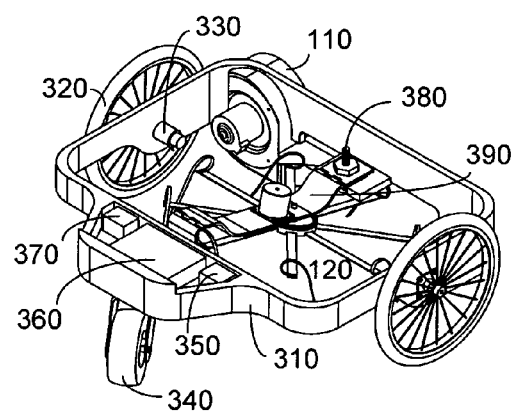
FIG.3A
FIG.3C
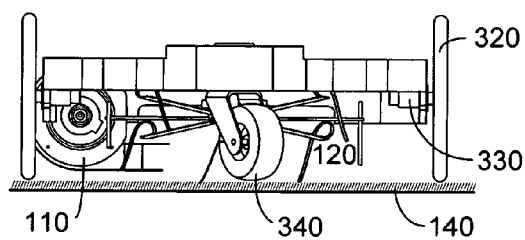
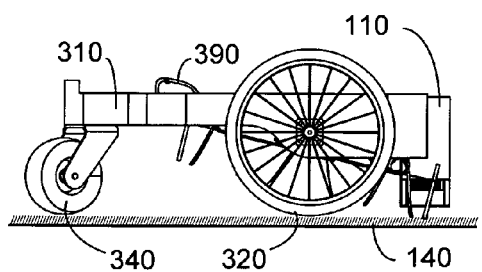
FIG.3B
FIG.3D

BLOWER AND ROTARY RAKE FOR DEBRIS HERDING

CROSS-REFERENCE TO RELATED APPLICATIONS

Reference is hereby made to co-pending U.S. patent application Ser. No. 12/152,582 filed on even date, and entitled "Autonomous blower for debris herding".

BACKGROUND OF THE INVENTION

Fallen leaves should be removed from a lawn soon after they fall, both for aesthetics and for the health of the lawn. Delaying their removal allows dew and rain on the fallen leaves to hasten their partial decomposition, which exacerbates their removal. There are broadly two ways to remove leaves and other debris from lawns: vacuuming or mechanically impelling leaves into a transportable receptacle, and blowing or raking the leaves to a storage location. This invention relates to the former.

Manually operated rakes are known, however they are expensive in human time consumed. Automated rakes are known, such as the rotary rake in U.S. Pat. No. 333,917. Air blowers in a variety of configurations improve the rate of leaf herding over manual rakes, however they are generally energetically inefficient.

Exergy, or thermodynamic availability, is energy available from the immediate environment. As energy costs rise, it is preferable for appliances such as leaf herders to be exergetically powered, for example from solar power. Solar powered vehicles are known, such as the Mars Rover; functions in addition to locomotion performed by solar powered vehicles generally need to be engineered for low average power consumption.

BRIEF SUMMARY OF THE INVENTION

The present invention is directed to an energetically efficient device for moving debris on a surface, such as leaves on a lawn. An air blower acts together with a tilted rotary rake to dislodge and impel the debris. A motor driven chassis transports the blower and the rotary rake across the lawn. The blower and rotary rake can be exergetically powered, such as by a solar cell array mounted to the chassis.

BRIEF DESCRIPTION OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 3A is a top plan view corresponding to a sub-assembly of the combined blower and rotary rake shown in FIG. 1A, showing the chassis, drive mechanisms, and rake height adjustment;

FIG. 3B is a back elevation view corresponding to the sub-assembly shown in FIG. 3A;

FIG. 3C is a top isometric view corresponding to the sub-assembly shown in FIG. 3A;

FIG. 3D is a side elevation view corresponding to the sub-assembly shown in FIG. 3A;

DETAILED DESCRIPTION OF THE INVENTION

Figure 1A:
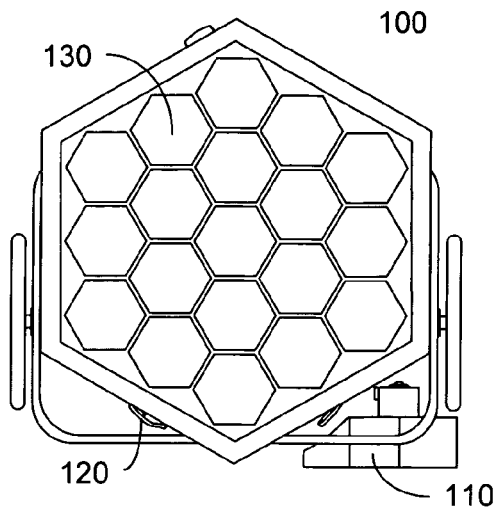
FIG. 1A is a top plan view of a combined blower and rotary rake for herding debris in accordance with the present invention.
Figure 1D:
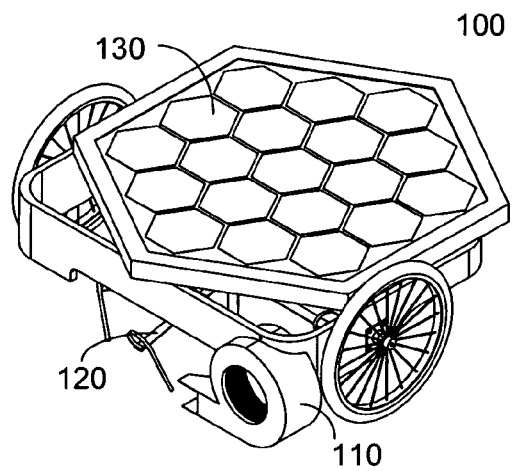
FIG. 1D is a top isometric view corresponding to the combined blower and rotary rake shown in FIG. 1A.
Figure 1B:
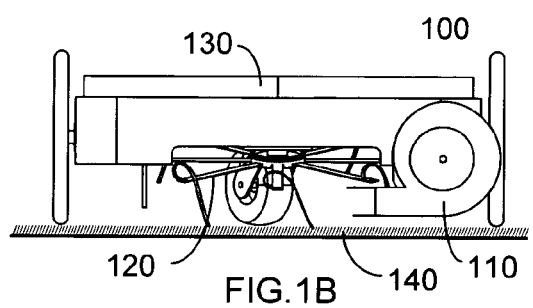
FIG. 1B is a front elevation view corresponding to the combined blower and rotary rake shown in FIG. 1A.
Figure 1E:
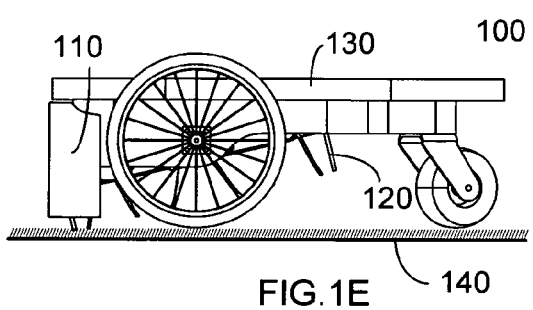
FIG. 1E is a side elevation view corresponding to the combined blower and rotary rake shown in FIG. 1A.
Figure 1C:
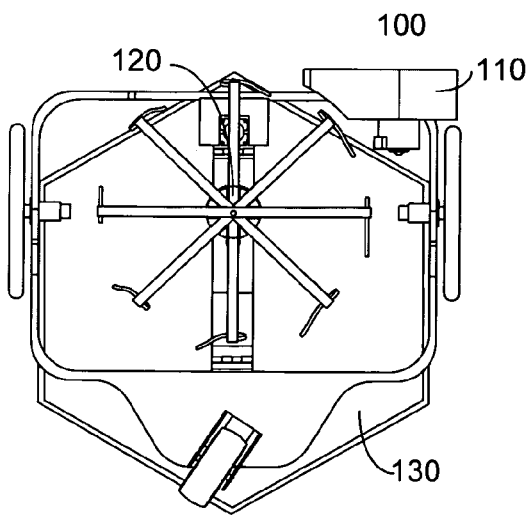
FIG. 1C is a bottom view corresponding to the combined blower and rotary rake shown in FIG. 1A.
Figure 1F:
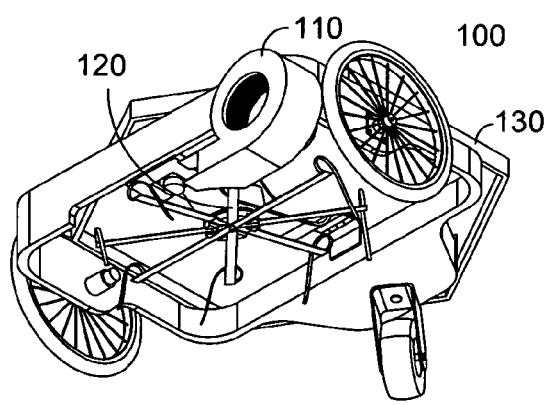
FIG. 1F is a bottom isometric view corresponding to the combined blower and rotary rake shown in FIG. 1A.

FIGS. 1A-1F are six views of a debris herder (100) according to this invention. The air blower (110) is shown mounted on the front left corner of the debris herder (100), with the exhaust from the air blower (110) shearing the surface of the lawn (140) as it crosses the front of the debris herder from left to right. A tilted rotary rake (120) is mounted centrally in the debris herder (100), and is oriented to contact the portion of the lawn (140) being sheared by the exhaust from the air blower (110). A solar cell array (130) is indicated as a portion of the top of the debris herder (100). These components will be subsequently described in more detail.

FIGS. 2A-2D are four views of a sub-assembly of a debris herder (100) comprising the air blower (110) and the rotary rake (120). The air blower (110) has an electric motor (240) that rotates a squirrel cage centripetal impeller (250) within a cowling (270), exhausting a directed air flow (260). The air flow (260) diverges with distance from the air flow exit from the air blower (110). In contrast, an air flow will converge as it approaches the intake to an air blower or vacuuming apparatus. The air flow (260) is generally horizontal and adjacent to the lawn (140), and creates a shearing force impelling debris on the lawn. Many known configurations of air movers can provide the directed air flow (260), however an efficient, low turbulence, centripetal blower is preferred. The peak air velocity in the blower exhaust is generally in the range of 6 to 20 meters per second, and is optimally about 12 meters per second. The air flow rate in the blower exhaust is generally in the range of 0.03 to 0.3 cubic meters per second, and is optimally about 0.08 cubic meters per second. For example, the car air conditioner blower from a 1995 Lincoln Continental will produce these air flows while consuming between 20 and 50 watts.

Figure 2A:
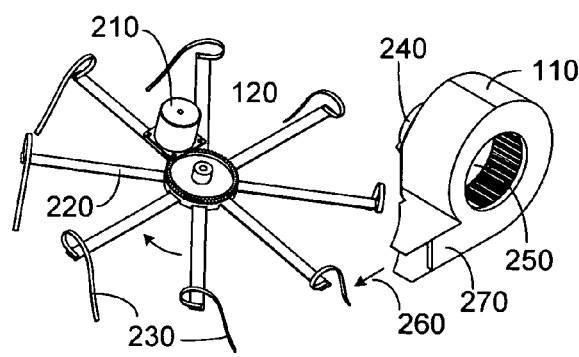
FIG. 2A is a top isometric view of a sub-assembly of the combined blower and rotary rake shown in FIG. 1A, showing the blower and rotary rake.
Figure 2C:
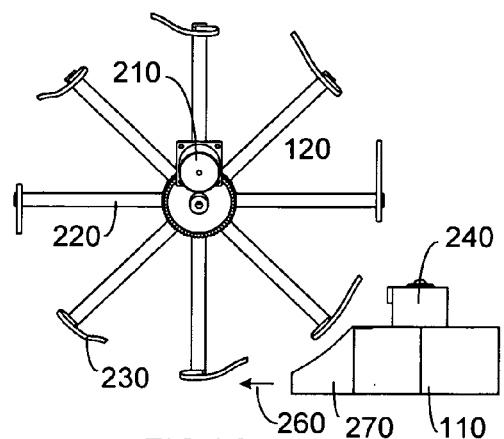
FIG. 2C is a top plan view corresponding to the sub-assembly shown in FIG. 2A.
Figure 2B:
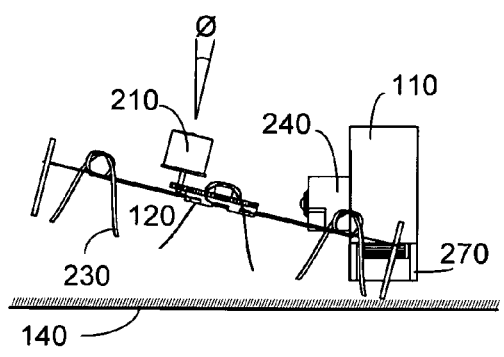
FIG. 2B is a side elevation view corresponding to the sub-assembly shown in FIG. 2A.
Figure 2D:
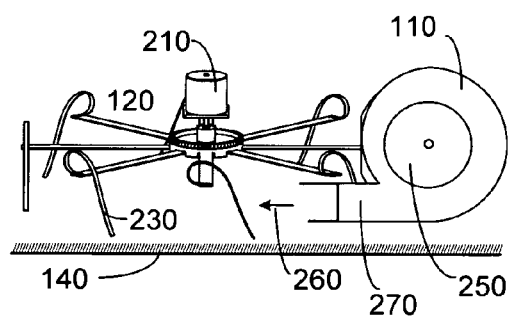
FIG. 2D is a front elevation view corresponding to the sub-assembly shown in FIG. 2A.

The rotary rake (120) in FIGS. 2A-2D comprises an electric drive motor (210) driving a hub through a spur gear. The hub supports relatively rigid radial arms (220). Relatively flexible tines (230) are attached to the distal ends of the relatively rigid radial arms (220). The tines (230) are preferably formed sheet metal welded to heavier gage metal radial arms (220). The axis of rotation of the rotary rake is tilted from a local normal to the lawn (140) by an angle Ø, as shown in FIG. 2B. The rotation direction of the rotary rake is clockwise in the plan view of FIG. 2C. The tines (230) contact the lawn at their lowest point of travel as the rotary rake revolves; contact occurs within the portion of the lawn being sheared by the air flow (260), and both the tines and the air urge debris in that portion in generally the same tangential direction. The profile of the tines (230) makes them deflect only slightly due to centripetal forces, however they deflect relatively easily upon contact with debris or the lawn.

The diameter of the rotary rake (120) generally sets the length scale for the debris herder (100). When operated exergetically from the solar cell array (130), the available power increases approximately as aerial footprint of the solar cell array (100). Most of the power during actually operation is expended in the blower motor (240) and the rotary rake motor (210), so that additional available power generally corresponds to a linear increase in area per second cleared. Thus the clearing rate is roughly proportional to the square of the diameter of the rotary rake (120). However the cost of the solar cell array and other components generally increase at least as fast as their area or mass, so that the cost per area cleared per second does not necessarily improve significantly with aerial footprint. Also, in typical lawn clearing applications, it is desirable that the debris herder be small enough that it can readily maneuver amongst shrubs and other obstacles, which favors a smaller footprint. The diameter of the rotary rake should be between 0.3 and 3 meters, and should optimally be approximately 0.5 meters. The tilt angle Ø and diameter determines the width of the swath cleared by the rotary rake. The tilt angle Ø should be between 3 degrees and 25 degrees, and should optimally be approximately 10 degrees. A 10 degree tilt angle with a 0.5 meter diameter rotor gives a cleared swath width of about 15 centimeters. The tines should preferably push debris like leaves instead of shredding them, so that the radial width of the tines should be at least 2 millimeters, and is preferably between 5 and 15 millimeters.

FIGS. 3A-3D are four views of the sub-assembly of a debris herder (100) shown in FIGS. 2A-2D with several additional components. Shown again are the blower (110) and the rotary rake (120). Other components shown in this sub-assembly are the chassis (310), the drive wheels (320), the drive motors (330), the swivel wheel (340), the controller (350), the battery (360), the location sensor (370), the height adjustment screw (380), and the adjustable rotary rake mounting bracket (390). The drive wheels (320) are preferably of relatively large diameter to more easily navigate obstacles and rough terrain. The drive wheel diameter is preferably between 0.14 and 0.5 meters. The drive wheels (320) preferably have a tread for traction, and low mass to reduce the required up-hill climbing power requirements. Baby buggy wheels work well. The drive motors (330) afford independent acceleration and braking of the two drive wheels. These, together with the back tire (340) mounted on a swivel, comprise a steering mechanism that allow the debris herder (100) to both turn and move freely. The drive motors are preferably gear reduced DC motors or stepper motors. The motors (340) and the blower (110) mount on the chassis (310). To achieve satisfactory aerial clearing rates of several acres per week, the debris herder requires a relatively low translational velocity. With a 15 centimeter swath, and assuming the debris herder can be active 8 hours out of each 24, a linear velocity of about 30 centimeters per second corresponds to clearing about 2 acres per week. Alternative configurations to this tricycle include four or more wheels, tracks, compliant suspension, and steerable wheels.

The rotary rake (120) in FIGS. 3A-3D is attached to a hinged mounting bracket (390). The back end of the hinged mounting bracket (390) attaches rotatably to the chassis (310), and the front end of the hinged mounting bracket (390) attaches to a nut supported by the height adjustment screw (380). The motor actuating the adjustment screw (380) will be described subsequently. Rotating the height adjustment screw (380) causes the tilt angle Ø of the tilted rotary rake to change, and causes the clearance between the tips of the tines (230) and the lawn to change. For example, if the lawn grass is tall, rotary rake can be lifted away from the ground by rotating the height adjustment screw (380) so that the tines do no damage to the lawn.

The chassis (310) above the swivel tire (340) in FIGS. 3A-3D supports several electrical components: the controller (350), the battery (360), and the location sensor (370). The controller (350) is electrically connected to the solar cell array (130), the blower motor (240), the rotary rake motor (210), each drive motor (330), the battery (360), the motor driving the rotary rake height adjustment screw (380), and the location sensor (370). The controller regulates the amount of power each motor receives from both the battery and the solar cell array. The controller performs impedance matching between these sources and sinks as required. The controller monitors the current draw and back EMF from the rotary rake motor, lowering the rotary rake using the height adjustment screw (380) when the rotary rake is free-wheeling, and raising the rotary rake when the load is starting to stall the motor. The controller regulates the power to the blower; if the battery is charged, and sunlight on the solar cell array is providing more power than is needed to normally operate the blower and the rake, additional power can be applied to the blower motor to obtain a farther throw of the dislodged debris. The location sensor (370) preferably provides GPS coordinate information to the controller (350) so that the controller can navigate in a prescribed geography using the drive motors (330). The controller executes a control program to combine the inputs of position, solar cell power, and rotary rake loading, and remaining battery power, and to generate the outputs of battery charging and rate of rotation of each motor.

Figure 4A:
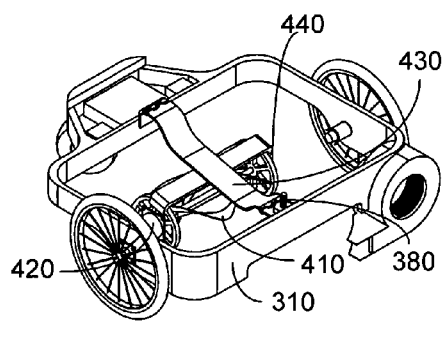
FIG. 4A is a top isometric view corresponding to a sub-assembly of a combined blower and mower.
Figure 4D:
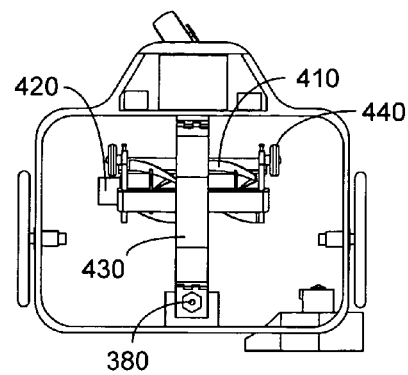
FIG. 4D is a bottom view corresponding to the sub-assembly shown in FIG. 4A.
Figure 4B:
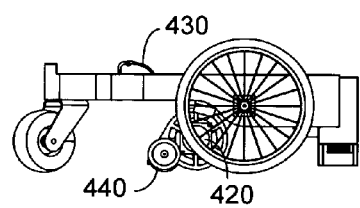
FIG. 4B is a side elevation view corresponding to the sub-assembly shown in FIG. 4A.
Figure 4E:
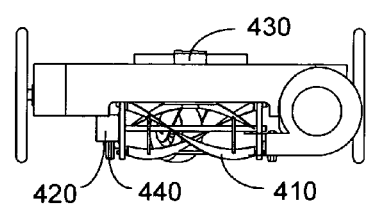
FIG. 4E is a front elevation view corresponding to the sub-assembly shown in FIG. 4A.
Figure 4C:
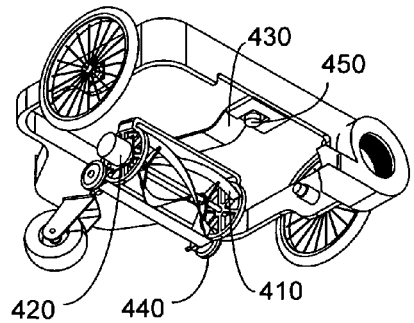
FIG. 4C is a bottom isometric view corresponding to the sub-assembly shown in FIG. 4A.
Figure 4F:
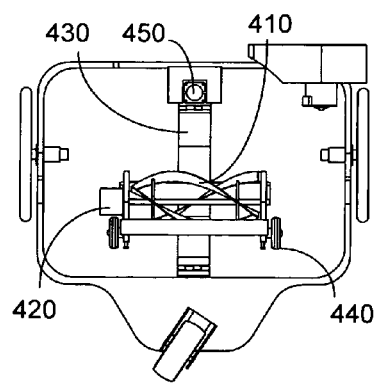
FIG. 4F is a top plan view corresponding to the sub-assembly shown in FIG. 4A.

Clearing lawn debris is a seasonal activity. FIGS. 4A-4F provide an example of adapting the debris herder of FIGS. 1A-1F to the task of lawn mowing. The rotary rake has been replaced with a reel mower (410) suspended by a bracket (430) from the chassis and from the height adjustment screw (380). Wheels (440) provide additional alignment of the reel mower (410) to the lawn. An electric motor (420) rotates the reel mower (410). The bottom isometric view, FIG. 4C, and the bottom plan view, FIG. 4F, show the height adjustment screw motor (440) common to the debris herder and the lawn mower.

The solar cell array (110) of FIGS. 1A-1F and FIGS. 4A-4F is preferably an array of silicon photovoltaic cells. Other solar energy converters can be used, such as gallium arsenide cells, multi-layer devices, and thermoelectric devices.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A lawn debris blower comprising:
   a chassis movable across the lawn;
   a blower attached to the chassis, the blower producing a diverging flow of air; and
   a tilted rotary rake attached to the chassis, the axis of the tilted rotary rake having a tilt from the normal direction to the lawn and from a horizontal plane, the diverging flow of air from the blower being generally tangent to the lowest portion of the circumference of the tilted rotary rake, allowing the tilted rotary rake and the diverging flow of air to impel lawn debris in combination.

2. The lawn debris blower of claim 1, further comprising a drive motor that impels the chassis across the lawn.

3. The lawn debris blower of claim 2, further comprising:
   a steering mechanism that directs the motion of the chassis across the lawn;
   a controller attached to the chassis, the controller being electrically connected to the drive motor and the steering mechanism;
   a position sensor producing a position signal indicative of the location of the chassis on the lawn, the position sensor being attached to the chassis and electrically connected to the controller, the position signal being transmitted to the controller; and
   a control program executed by the controller, the control program regulating the steering mechanism and the drive motor, and the control program utilizing the position signal.

4. The lawn debris blower of claim 1, wherein the blower and the tilted rotary rake are electrically powered, further comprising a battery attached to the chassis and electrically connected to the blower and the tilted rotary rake.

5. The lawn debris blower of claim 4, further comprising:
   a solar energy converter; and
   a charging controller electrically connected to the solar energy converter, the battery, the blower and the tilted rotary rake, the charging controller regulating the amount of electrical power conducted from the solar energy converter to the battery, the blower, and the tilted rotary rake.

6. The lawn debris blower of claim 1, further comprising a height adjustment that varies the position of the tilted rotary rake on the chassis.

7. A method of impelling debris across a lawn, comprising:
   blowing a diverging stream of air across a portion of the lawn;
   rotating a tilted rotary rake having an axis of rotation and a plurality of tines extending radially around the axis of rotation, wherein the axis of rotation is tilted from the normal direction to the lawn and from a horizontal plane; and
   mechanically agitating the portion of the lawn with the tines of the rotating tilted rotary rake, allowing the diverging stream of air and the tines of a rotating tilted rotary rake to impel lawn debris in combination.

8. The method of claim 7, further comprising:
   converting sunlight into electrical power;
   storing a portion of the electrical power converted from sunlight in a battery; and powering the blower with electrical power converted from sunlight and stored in the battery.

9. The method of claim 7, further comprising adjusting the height of the tilted rotary rake above the lawn in response to changes in lawn conditions.

10. The method of claim 7, wherein the tilt of the axis of rotation ranges between 3 degrees and 25 degrees from the normal direction to the lawn.

11. A lawn debris blower comprising:
    a chassis that is configured to move across the lawn;
    a rotary rake rotatably attached to the chassis, the rotary rake having an axis of rotation that ranges between 3 degrees and 25 degrees from the normal direction to the lawn while the chassis moves across the lawn; and
    a blower attached to the chassis, the blower being configured to produce a diverging flow of air that is generally tangent to a lowest portion of the circumference of the rotary rake while the chassis moves across the lawn, such that the rotation of the rotary rake and the produced diverging flow of air impel lawn debris in combination.

12. The lawn debris blower of claim 11, wherein the blower and the rotary rake are configured to impel the lawn debris in the same tangential direction.

13. The lawn debris blower of claim 11, further comprising a drive motor that is configured to impel the chassis across the lawn.

14. The lawn debris blower of claim 11, wherein the blower and the rotary rake are electrically powered, and wherein the lawn debris blower further comprises a battery retained by the chassis and electrically connected to the blower and the rotary rake.

15. The lawn debris blower of claim 14, further comprising:
    a solar energy converter; and
    a charging controller electrically connected to the solar energy converter, the battery, the blower and the rotary rake, the charging controller being configured to regulate an amount of electrical power conducted from the solar energy converter to the battery, the blower, and the rotary rake.

* * * * *

UNITED STATES PATENT AND TRADEMARK OFFICE
CERTIFICATE OF CORRECTION

| | | |
|---|---|---|
| PATENT NO. | : 8,151,410 B2 | |
| APPLICATION NO. | : 12/152607 | |
| DATED | : April 10, 2012 | |
| INVENTOR(S) | : Rachael Anne Batchelder et al. | |

It is certified that error appears in the above-identified patent and that said Letters Patent is hereby corrected as shown below:

Title page:

Item [57] Abstract, line 6, after "The blower and rotary rake can be", delete "energetically" and insert --exergetically--

Signed and Sealed this
Thirty-first Day of December, 2013

Margaret A. Focarino
*Commissioner for Patents of the United States Patent and Trademark Office*